US008037749B2

(12) United States Patent
Araki

(10) Patent No.: US 8,037,749 B2
(45) Date of Patent: Oct. 18, 2011

(54) NETWORK MONITORING METHOD, NETWORK MONITORING APPARATUS, LINE FAILURE PREVENTION SYSTEM AND COMPUTER PROGRAM OF NETWORK MONITORING APPARATUS

(75) Inventor: Junichi Araki, Tokyo (JP)

(73) Assignee: NEC Corporation, Tokyo (JP)

( * ) Notice: Subject to any disclaimer, the term of this patent is extended or adjusted under 35 U.S.C. 154(b) by 688 days.

(21) Appl. No.: 12/190,825

(22) Filed: Aug. 13, 2008

(65) Prior Publication Data
US 2009/0047943 A1 Feb. 19, 2009

(30) Foreign Application Priority Data

Aug. 16, 2007 (JP) ................. 2007-212207

(51) Int. Cl.
*G01W 1/00* (2006.01)
(52) U.S. Cl. ................................. 73/170.16
(58) Field of Classification Search .................. None
See application file for complete search history.

(56) References Cited

U.S. PATENT DOCUMENTS

| 2,202,452 A * | 5/1940 | Hildabrand | 73/170.23 |
| 2,402,688 A * | 6/1946 | Skurnick | 340/870.15 |
| 6,427,535 B1 * | 8/2002 | Sakai et al. | 73/587 |
| 7,596,997 B2 * | 10/2009 | Brown et al. | 73/170.17 |
| 7,725,262 B2 * | 5/2010 | Loukos | 702/3 |
| 7,774,139 B1 * | 8/2010 | Rose et al. | 702/3 |

FOREIGN PATENT DOCUMENTS

| EP | 1052812 A2 | 11/2000 |
| JP | 2005268977 A | 9/2005 |
| JP | 2006203793 A | 8/2006 |
| JP | 2007037029 A | 2/2007 |
| JP | 2007047148 A | 2/2007 |

OTHER PUBLICATIONS

EP Search Report for EP 08 16 1002 completed Dec. 19, 2008.
M. Li, et al., "Weather Forecasting—Predicting Performance for Streaming Video over Wireless LANs", 2005 [online] <http://portal.acm.org/ft_gateway.cfm?id=1065993&type=pdf&coll=GUIDE&dl=GUIDE&CFID=15757680&CFTOKEN=79758984> p. 33-38.

* cited by examiner

Primary Examiner — Andre Allen

(57) ABSTRACT

Disclosed is a network monitoring method including: a predicted amount of rainfall obtaining step of obtaining a predicted amount of rainfall generated in a predetermined time in a current line route; a prediction step of predicting whether or not a line failure occurs in the current line route caused by the predicted amount of rainfall assuming it rains actually in the current line route with an amount of rainfall substantially equivalent to the predicted amount of rainfall in the predetermined time in the current line route; and a change instruction step of instructing the radio communication network to change the current line route into a different line route on which it is predicted that no line failure caused by rainfall occurs and to control the radio communication network to change the current line route into the different line route, before the predetermined time passes.

24 Claims, 7 Drawing Sheets

NETWORK MONITORING METHOD, NETWORK MONITORING APPARATUS, LINE FAILURE PREVENTION SYSTEM AND COMPUTER PROGRAM OF NETWORK MONITORING APPARATUS

This application is based upon and claims the benefit of priority from Japanese Patent Application No. 2007-212207, filed on Aug. 16, 2007, the disclosure of which is incorporated herein in its entirety by reference.

TECHNICAL FIELD

The present invention relates to a network monitoring method and a network monitoring apparatus for monitoring a radio communication network. Moreover, the present invention relates to a line failure prevention system which includes a meteorological data server, the radio communication network, and the network monitoring apparatus and relates to a program of the network monitoring apparatus.

BACKGROUND ART

In mobile communication business, an amount of traffic increases rapidly according to spread of a cellular phone and service diversification thereof. Under such background, a network in which mobile base stations (i.e. the number of cells) increases and a distance between cells is configured. In a microwave communication network which connects mobile base stations with each other, a link in which a transmission distance is short is useful and a large number of frequency channels are used. Accordingly, in the microwave communication network, a high frequency band of no smaller than 10 GHz is mainly used.

Generally, the microwave communication network suffers from degradation of line quality (occurrence of a line failure) caused by fading and reflection. In order to improve the degradation, technique such as frequency diversity and space diversity is applied. However, in communication between the mobile base stations in which the high frequency band of no smaller than 10 GHz is used, the degradation of the line quality caused by rainfall is larger than that caused by the fading and the reflection. Accordingly, the degradation of the line quality (occurrence of the line failure) caused by the rainfall can not be avoided even through a communication method or a system configuration represented by the frequency diversity or the space diversity is used. Consequently, large amount of rainfall causes line disconnect.

Further, in this specification, the line failure is defined to be a generic designation of a failure which occurs in the line, that is, the line disconnect, instantaneous line disconnect thereof or the like.

It is very serious problem that a large amount of rainfall leads to the line failure and the line disconnect as mentioned above with respect to maintaining the line quality and providing a high-value added service.

Patent document 1 (Japanese Patent Application Laid-Open No. 2005-268977) discloses a radio base station which can detect an actual cluster of water vapor/rain cloud in FIG. 3 and FIG. 5 thereof. In the document 1, the radio base station uses an effect that a navigation signal transmitted from GPS (Global Positioning System) satellite is received by the radio base station with a certain delay caused by existence of the actual cluster of water vapor/rain cloud. Moreover, the patent document 1 discloses in FIG. 3 thereof that when the radio base station judges that there exists the actual cluster of water vapor/rain cloud by detecting the delay on receiving the navigation signal from the GPS satellite, the radio base station automatically adjusts a transmitting power/an failure correcting capability and prevents disconnect of a wireless line caused by the rainfall. Furthermore, the patent document 1 discloses in FIG. 5 thereof that the whole network shares information on existence of the actual cluster of water vapor/rain cloud which the radio base station obtains by detecting the delay of the received navigation signal from the GPS satellite, a route different from the route suffering from the disconnect of the wireless line caused by the rainfall is set up on the basis of the shared information, and consequently the network avoids the disconnect of the wireless line caused by the rainfall.

Patent document 2 (Japanese Patent Application Laid-Open No. 2006-203793) discloses in FIG. 1 thereof that a satellite communication station detects transmission loss caused by actual rainfall or the like by detecting that an attenuation amount of a received signal level is not smaller than a predetermined value. Moreover, the patent document 2 discloses in FIG. 1 thereof that when the satellite communication station detects the transmission loss caused by the actual rainfall or the like by detecting that an attenuation amount of a received signal level is not smaller than a predetermined value, the satellite communication station transmits a line change request signal to a control station. Moreover, the patent document 2 discloses that when the control station receives the line change request signal, the control station re-assigns a communication line by changing a transmission frequency of the satellite communication station, reducing a transmission frequency bandwidth and increasing transmission level.

Patent document 3 (Japanese Patent Application Laid-Open No. 2007-47148) discloses a navigation system which includes a navigation apparatus and an information center as shown in FIG. 1 thereof, and whose information center includes a means for forecasting weather at a predicted arrival time in different places on a traveling road on the basis of a weather forecast in different places to travel. However, the weather forecast (sunny, cloudy, rainy or the like) at the predicted arrival time in different places to travel (as described in the paragraph [0062] of the patent document 3) is only used to search for a predicted average traveling time according to the weather forecast along the road.

Patent document 4 (Japanese Patent Application Laid-Open No. 2007-37029) discloses a radio communication system which adopts an adaptive modulation method. A transmission apparatus of the radio communication system also includes a rainfall detecting unit and changes modulation method according to an amount of rainfall detected by the rainfall detecting unit. The line failure may occur according to extent of the amount of rainfall, since an actual rainfall during detecting the actual rainfall causes degradation of line quality.

As mentioned above, an apparatus as a network constituent such as the radio base station in the patent document 1, the satellite communication station in the patent document 2 and the transmission apparatus in the patent document 4 includes the rainfall detecting unit and judges degradation of the line quality after it begins to rain actually. If degradation of the line quality is judged after detecting the actual rainfall, the most rainfall except for a light rainfall (that is, usual rainfall, heavy rainfall, squall or the like) may cause the line failure or the line disconnect at the point of time on detecting the actual rainfall. Moreover, there is a problem that a temporary line disconnect may occur before changing line route to a different line route or before changing modulation method.

SUMMARY

An exemplary object of the present invention is to provide a network monitoring method, a network monitoring apparatus, a line failure prevention system, and a computer program of the network monitoring apparatus, which can prevent in advance occurrence of the line failure caused by the rainfall, by predicting occurrence of the line failure in a predetermined time based on a predicted amount of rainfall in the predetermined time, which is provided by a meteorological data server, and consequently, changing line route to the most suitable line route before it begins to rain.

A network monitoring method according to an exemplary aspect of the invention to be carried out by a processor in a network monitoring apparatus which is connected with a meteorological data server and a radio communication network and which monitors the radio communication network includes the steps of: a predicted amount of rainfall obtaining step of obtaining a predicted amount of rainfall generated in a predetermined time in a current line route in a radio communication network on the basis of weather forecast data of the meteorological data server; a prediction step of predicting whether or not a line failure occurs in the current line route caused by the predicted amount of rainfall assuming it rains actually in the current line route with an amount of rainfall substantially equivalent to the predicted amount of rainfall in the predetermined time in the current line route; and a change instruction step of instructing the radio communication network to change the current line route into a different line route on which it is predicted that no line failure caused by rainfall occurs and to control the radio communication network to change the current line route into the different line route, before the predetermined time passes, when it is predicted that the line failure occurs in the current line route.

In a network monitoring apparatus according to an exemplary aspect of the invention which is connected with a meteorological data server and a radio communication network and which monitors the radio communication network, the network monitoring apparatus including a processor, the processor, as the predetermined process, carries out, a predicted amount of rainfall obtaining process to obtain a predicted amount of rainfall generated in a predetermined time in a current line route of the radio communication network on the basis of a weather forecast data of the meteorological data server;

a prediction process to predict whether or not a line failure occurs in the current line route caused by the predicted rainfall assuming that it rains actually in the current line route with an amount of rainfall substantially equivalent to the predicted amount of rainfall in the predetermined time in the current line route; and a change instruction process to instructs the radio communication network to change the current line route into a different line route on which it is predicted that no line failure caused by rainfall occurs and to control the radio communication network to change the current line route into the different line route, before the predetermined time passes, when it is predicted that the line failure occurs in the current line route.

A line failure prevention system according to an exemplary aspect of the invention includes;
a meteorological data server;
a radio communication network; and
a network monitoring apparatus which is connected with the
    meteorological data server and the radio communication network and monitors the radio communication network, and
the processor, as the predetermined process, carries out,
    a predicted amount of rainfall obtaining process to obtain a predicted amount of rainfall generated in a predetermined time in a current line route of the radio communication network on the basis of a weather forecast data of the meteorological data server;

a prediction process to predict whether or not a line failure occurs in the current line route caused by the predicted rainfall assuming that it rains actually in the current line route with an amount of rainfall substantially equivalent to the predicted amount of rainfall in the predetermined time in the current line route; and a change instruction process to instructs the radio communication network to change the current line route into a different line route on which it is predicted that no line failure caused by rainfall occurs and to control the radio communication network to change the current line route into the different line route, before the predetermined time passes, when it is predicted that the line failure occurs in the current line route.

In a program for a network monitoring apparatus according to an exemplary aspect of the invention for a network monitoring apparatus which is connected with a meteorological data server and a radio communication network and which monitors the radio communication network, the network monitoring apparatus including a processor and a memory, the memory storing a program for the processor to carry out a predetermined process and working as a temporary memory when the processor executes the program, the program controls the processor to carry out, as the predetermined process, a predicted amount of rainfall obtaining process to obtain a predicted amount of rainfall generated in a predetermined time in a current line route of the radio communication network on the basis of a weather forecast data of the meteorological data server;

a prediction process to predict whether or not a line failure occurs in the current line route caused by the predicted rainfall assuming that it rains actually in the current line route with an amount of rainfall substantially equivalent to the predicted amount of rainfall in the predetermined time in the current line route; and a change instruction process to instructs the radio communication network to change the current line route into a different line route on which it is predicted that no line failure caused by rainfall occurs and to control the radio communication network to change the current line route into the different line route, before the predetermined time passes, when it is predicted that the line failure occurs in the current line route.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

An embodiment of the present invention will be described in the following with reference to drawings.

Embodiments of the present invention described below, which shows an example of the present invention, does not limit scope of the claims.

According to an embodiment (a first embodiment) of the present invention, a network monitoring apparatus which monitors a microwave communication network obtains weather forecast data (weather forecast data in a predetermined time (for example, in several minutes)) from Meteorological Agency or an external agency. The network monitoring apparatus predicts occurrence of a line failure (generic designation of failures which occur in lines, such as line disconnect, instantaneous disconnect or the like) in the predetermined time, based on a predicted amount of rainfall in the predetermined time which is predicted on the basis of the weather forecast data. If occurrence of the line failure is predicted, the network monitoring apparatus routes traffic before the rainfall. The present invention has an advantage that the line failure can be forestalled.

Figure 1:
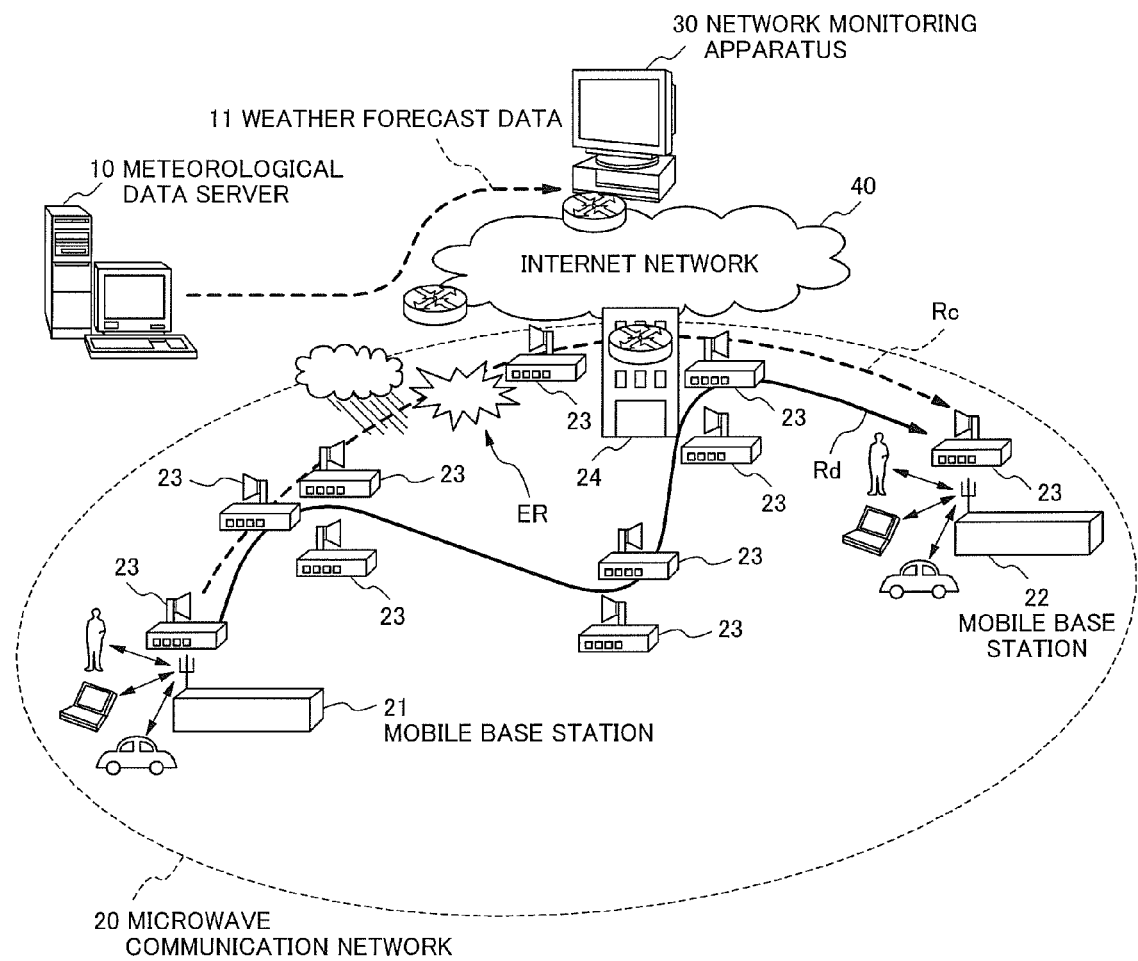
FIG. 1 is a drawing to show a line failure prevention system according to an embodiment of the present invention.

Referring to FIG. 1 of the embodiment of the present invention, a line failure prevention system includes a meteorological data server 10, a microwave communication network 20 and a network monitoring apparatus 30. The network monitoring apparatus 30 is a computer terminal connected to the meteorological data server 10 and the microwave communication network 20 via Internet 40. The network monitoring apparatus 30 monitors the microwave communication network 20.

The meteorological data server 10 is a computer terminal which is an apparatus in Meteorological Agency or the external agency.

The microwave communication network 20 shown in FIG. 1 includes mobile base stations 21 and 22, a plurality of microwave relay stations 23 and an operation center 24. The operation center 24 performs traffic management with respect to a plurality of the radio stations (the mobile base stations 21 and 22, and a plurality of the microwave relay stations 23). The network monitoring apparatus 30 is connected to the operation center 24 of the microwave communication network 20 via the Internet 40.

Figure 2:
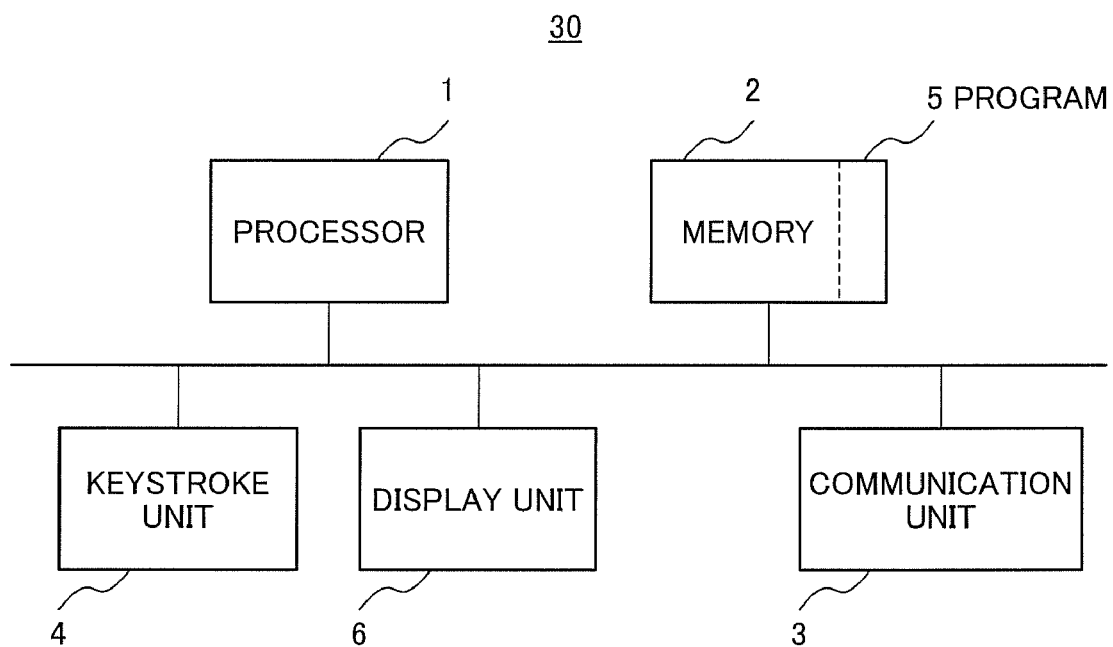
FIG. 2 is a block diagram of a network monitoring apparatus of the line failure prevention system shown in FIG. 1.

With reference to FIG. 2, the network monitoring apparatus 30 is a computer terminal having a processor 1 as a processing device and a memory 2 as a storage device. The memory 2 stores a program 5 (i.e. a program for the network monitoring apparatus) which the processor 1 executes for a predetermined process. The memory 2 works as a temporary memory when the processor 1 executes the program 5. Further, the network monitoring apparatus 30 includes a key inputting unit 4 and a communication unit 3. The communication unit 3 communicates with the meteorological data server 10 and the operation center 24 of the microwave communication network 20 via the Internet 40. Moreover, the network monitoring apparatus 30 includes a display 6 composed of a liquid crystal display, for example. The display 6 is controlled by the processor 1.

The processor 1 carries out the following process as the above-mentioned predetermined process according to the program 5 (program of the network monitoring apparatus) stored in the memory 2.

Figure 3:
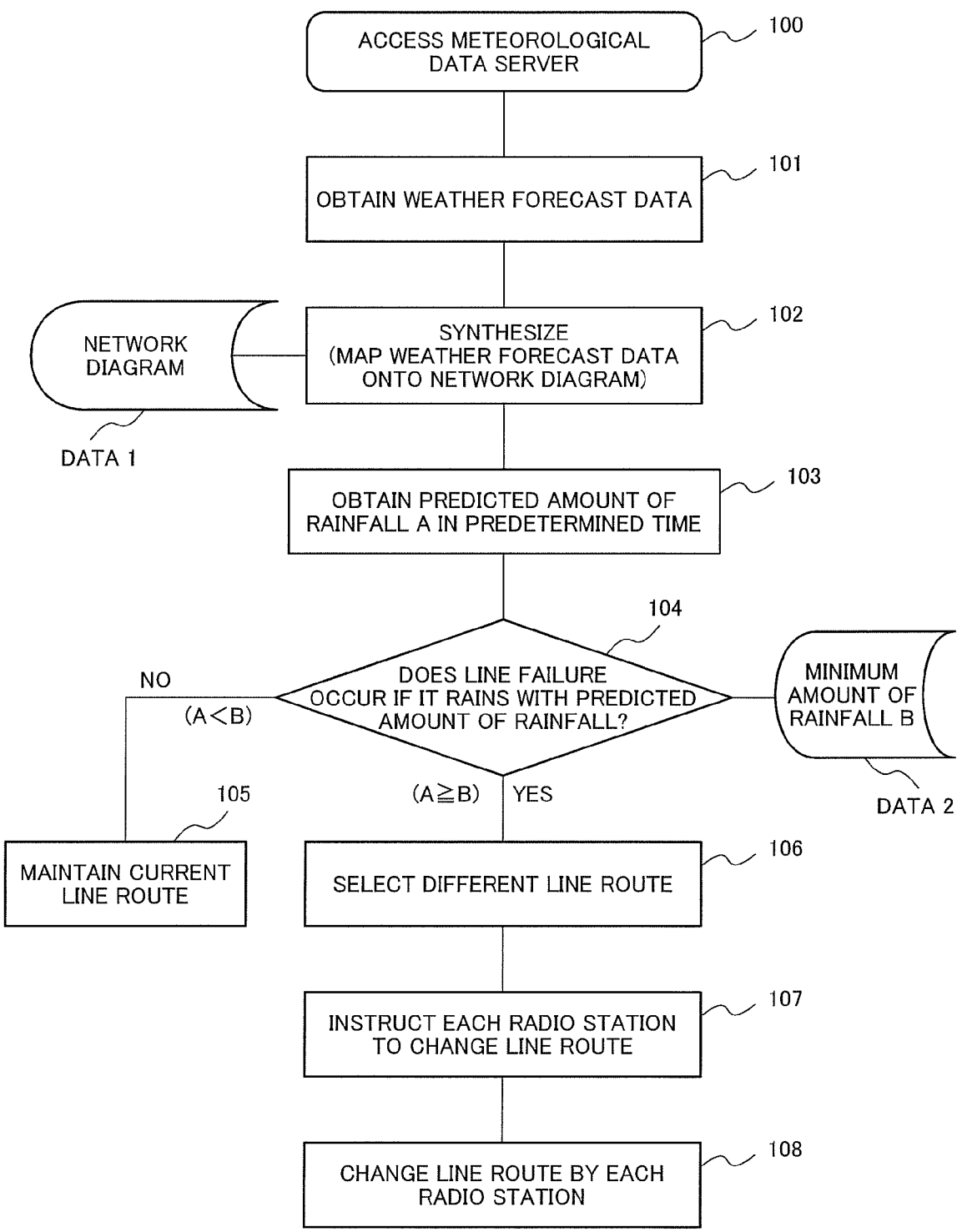
FIG. 3 is a flowchart illustrating operation of the network monitoring apparatus shown in FIG. 2.

That is, with reference to FIG. 1 to FIG. 3, the processor 1 controls the memory 2 to store a network (area surrounded with a broken line, that is, area indicated with reference number 20 in FIG. 1), that is a map onto which a plurality of the radio stations 21, 22 and 23 of the microwave communication network 20 and a current circuit route Rc are mapped, as a preset data (DATA1 of FIG. 3).

In this case, the processor 1 may control the display 6 to display a network diagram onto which a plurality of radio stations 21, 22 and 23 and the current circuit route Rc are mapped.

The processor 1 sets a minimum amount of rainfall B which causes the line failure as a different preset data in the memory 2 (DATA2 of FIG. 3).

Figure 4:
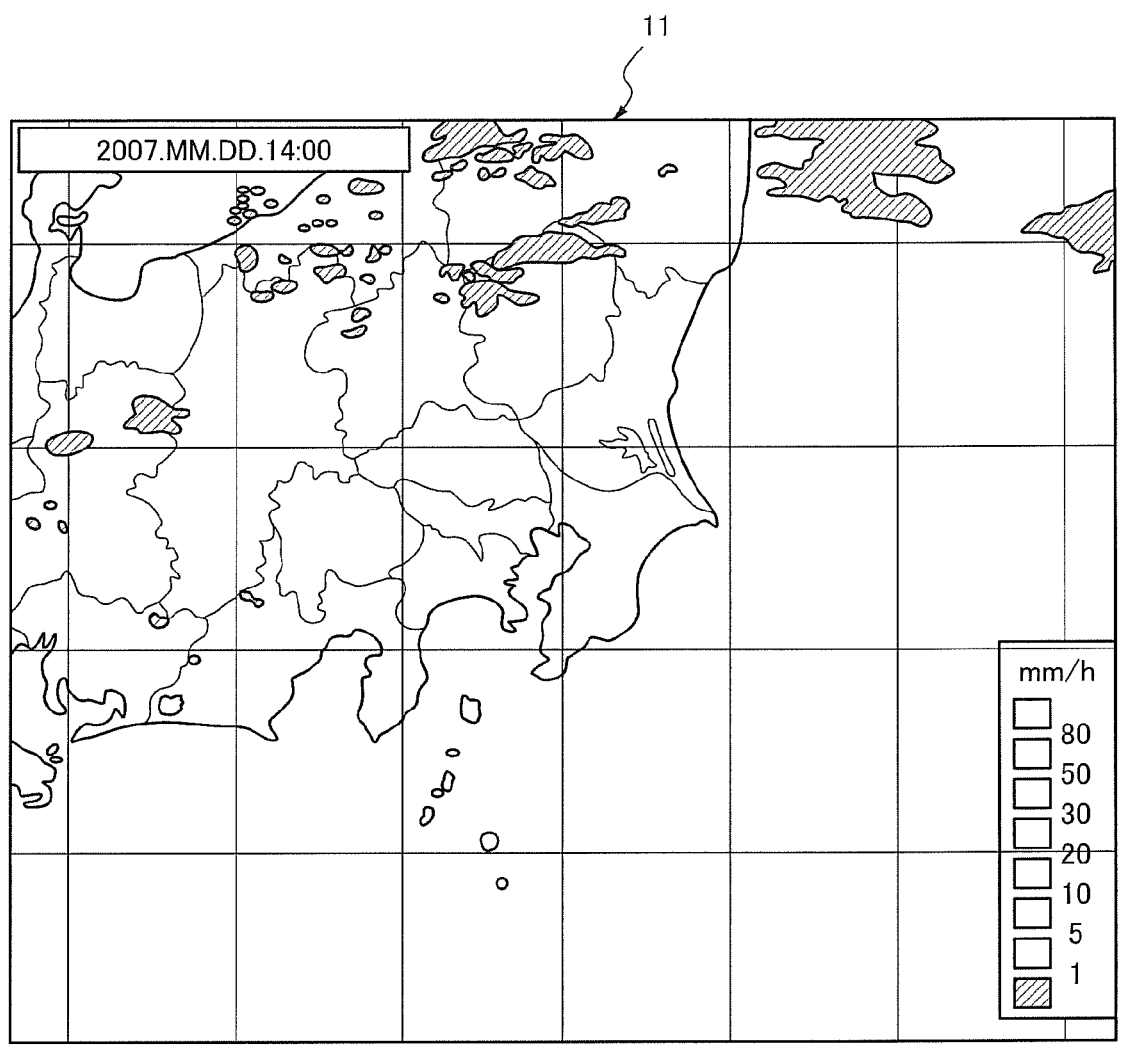
FIG. 4 shows a weather prediction data which the network monitoring apparatus shown in FIG. 2 obtains from a meteorological data server.

Then, the processor 1 accesses the meteorological data server 10 and obtains a weather forecast data 11 in which a predicted amount of rainfall A in the predetermined time in different places is mapped on a map (Steps 100 and 101 in FIG. 3). FIG. 4 shows the weather forecast data 11 provided by the meteorological data server 10.

According to an example of the weather forecast data 11 shown in FIG. 4, the weather forecast data 11 includes information on a rain cloud in the predetermined time described on a map and information on an amount of rainfall per unit time (mm/h) in the predetermined time in different places (latitude and longitude).

Moreover, the processor 1 maps the weather forecast data 11 onto the network diagram stored in the memory 2 and controls the memory 2 to store the network diagram onto which the weather forecast data 11 is mapped (Step 102 of FIG. 3).

In this case, the processor 1 may control the display 6 to display the network diagram onto which the weather forecast data 11 is mapped.

Then, the processor 1 obtains the predicted amount of rainfall A generated in the predetermined time in a current line route of the microwave communication network on the basis of the network diagram stored in the memory 2 onto which the weather forecast data 11 is mapped (Step 103 of FIG. 3).

The processor 1 carries out a predicted amount of rainfall obtaining process in which the processor 1 obtains the predicted amount of rainfall A generated in the predetermined time in the current line route Rc of the microwave communication network 20 on the basis of the weather forecast data 11 provided by the meteorological data server 10 (Steps 100 to 103 of FIG. 3).

Moreover, the processor 1 carries out a prediction process in which the processor 1 predicts whether or not a line failure ER occurs in the current line route Rc on the assumption that it rains actually in the current line route with an amount of rainfall almost equivalent to the predicted amount of rainfall in the predetermined time in the current line route Rc (Step 104 of FIG. 3).

Then, when any one of the predicted amount of rainfall A in the predetermined time in the current line route Rc is no less than the minimum amount of rainfall B, the processor 1 predicts that the line failure ER occurs in the current line route Rc. The minimum amount of rainfall B is stored in the memory 2.

On the other hand, when all of the predicted amount of rainfall A in the predetermined time in the current line route Rc are less than the minimum amount of rainfall B, the processor 1 predicts that the line failure ER does not occur in the current line route Rc.

Predicting that the line failure ER occurs in the current line route Rc, the processor 1 instructs a plurality of the radio stations 21, 22 and 23 of the microwave communication network 20 to change the current line route Rc into a different line route Rd (Step 106) on which it is predicted that the line failure ER caused by the rainfall does not occur, before the predetermined time passes (Step 107). Then, the processor 1 carries out a route change instruction in which the processor 1 controls a plurality of the radio stations 21, 22 and 23 of the microwave communication network 20 to change the current line route Rc into the different line route Rd (Step 108).

Thus, when predicting that the line failure ER occurs in the current line route Rc, the processor 1 instructs the microwave communication network 20 to change the current line route Rc into the different line route Rd on which it is predicted that the line failure ER caused by the rainfall does not occur, before the predetermined time passes. Moreover, the processor 1 carries out the line route change instruction in which the processor 1 controls the microwave communication network 20 to change the current line route Rc into the different line route Rd (Steps 106 to 108).

Predicting that the line failure ER does not occur in the current line route Rc, the processor 1 carries out a process to maintain the current line route Rc as the above-mentioned predetermined process without the instruction to the microwave communication network 20 to change the current line route Rc into the different line route Rd (Step 105).

Next, a constituent of the line failure prevention system shown in FIG. 1 will be described in detail.

A microwave communication station (microwave communication apparatus) of the radio stations 21, 22 and 23 of the microwave communication network 20 forms a network which includes a ring, a mesh or the like so that a route may be selected among a plurality of routes.

The network monitoring apparatus 30 is, for example, a computer terminal which works according to program control. The network monitoring apparatus 30 includes in advance the network diagram that is a map onto which each of the radio stations 21, 22 and 23 and a plurality of routes Rc, Rd or the like are mapped, information on apparatuses of each radio station and a line design data of each route. Moreover, the network monitoring apparatus 30 monitors an alarm from the microwave communication apparatuses included in each of the radio stations 21, 22 and 23 and controls functions thereof.

According to the embodiment of the present invention, the network monitoring apparatus 30 accesses the meteorological data server 10 which stores a meteorological data via the Internet 40, and obtains the weather forecast data 11 in the predetermined time. The obtained weather forecast data 11 includes an analyzed amount of rainfall or the predicted amount of rainfall and is mapped onto the map as shown in FIG. 4. Moreover, the obtained weather forecast data 11 includes information on the predicted amount of rainfall per the unit time (mm/h) in different places (latitude and longitude) as shown in FIG. 4.

The network monitoring apparatus 30 maps the obtained weather forecast data 11 onto the network diagram which is stored in the network monitoring apparatus 30. The network monitoring apparatus 30 predicts the amount of rainfall (mm/h) generated in the predetermined time in different places of the radio stations 21, 22 and 23 on the basis of the network diagram mapped in this manner.

The network monitor 30 predicts whether or not the line failure occurs according to the predicted amount of rainfall (mm/h) Furthermore, predicting that the line failure occurs caused by the rainfall, the network monitoring apparatus 30 instructs each microwave communication station of the radio stations 21, 22 and 23 in a target link to change the current line route into the most suitable route Rd which does not suffer from any influence of rainfall.

Then, it is supposed that each microwave communication station of the radio station 21, 22 and 23 and incidental apparatus thereof include cross-connect function which makes it possible to change a traffic route.

Thus, according to the embodiment of the present invention, degradation of the line quality caused by the rainfall can be prevented in advance. Furthermore, according to the embodiment of the present invention, the microwave communication network 20 can be utilized efficiently.

Next, an operation of the line failure prevention system illustrated in FIG. 1 will be described in detail with reference to a flowchart shown in FIG. 3.

According to the embodiment of the present invention, the network monitoring apparatus 30 includes the network diagram onto which each of the radio stations 21, 22 and 23 and a plurality of routes Rc, Rd or the like are mapped, as a storing data (DATA 1 of FIG. 3). Moreover, the network monitoring apparatus 30 includes the minimum amount of rainfall B (mm/h) which is calculated on the basis of line design data (calculated line quality) of a plurality of routes Rc, Rd or the like and which causes the line failure, as a different storing data (DATA 2 of FIG. 3).

In actual operations, the network monitoring apparatus 30 obtains the weather forecast data 11 (analyzed amount of rainfall or predicted amount of rainfall) in the predetermined time which is mapped onto the map as shown in FIG. 4 and provided by the meteorological data server 10. Since weather changes from hour to hour, the network monitoring apparatus 30 obtains the updated weather forecast data 11 timely (Steps 100 and 101 of FIG. 3).

The network monitoring apparatus 30 overwrites the weather forecast data obtained in Step 101 on the network diagram and outputs a map onto which the network diagram and movement of the rain cloud are mapped (Step 102 of FIG. 3).

The network monitoring apparatus 30 obtains the predicted amount of rainfall A (mm/h) in the predetermined time in different places where the radio station is located from a map data generated in Step 102 (Step 103 of FIG. 3).

Then, the network monitoring apparatus 30 compares the predicted amount of rainfall A, which is obtained in Step 103, in the predetermined time in different places where the radio station is located with the minimum amount of rainfall B which causes the line failure (Step 104 of FIG. 3). If the amount of rainfall A is less than that of the rainfall B, the network monitoring apparatus 30 maintains the current line route Rc (Step 105 of FIG. 3). On the other hand, if the amount of rainfall A is equal to or more than that of the rainfall B, the network monitoring apparatus 30 performs route selection in order to avoid influence caused by the rainfall (Step 106 of FIG. 3).

In the route selection in Step 106, the different line route is selected in consideration of following items for the route selection, (A) a route with no influence caused by the rainfall, (B) a route length to the destination and (C) transmission capacity of each route or the like. Moreover, sequence for the route selection includes a hysteresis so that the route does not frequently change in the route selection. The different line route determined in this manner is shown as the different line route Rd in FIG. 1.

The network monitoring apparatus 30 instructs all the microwave communication stations of the radio stations 21, 22 and 23 which are on the line route which suffers from the influence caused by the rainfall (current line route Rc) and on the line route which is selected in the above mentioned manner (different line route Rd) to change traffic (Step 107 of FIG. 3).

The microwave communication stations of the radio stations 21, 22 and 23 which receive the instruction from the network monitoring apparatus 30 change the traffic simultaneously. Owing to the change, consistent routing throughout the entire network can be established (Step 108 of FIG. 3).

Next, a different embodiment (a second embodiment) of the present invention will be described in the following. The embodiment which shows an example of the present invention does not also limit the scope of the claims.

In a line failure prevention system of the second embodiment of the present invention, when it is predicted that a line failure occurs caused by a predicted amount of rainfall in a current line route, an adaptive modulation function is used. Thereby, a radio modulation method of each radio station of the current line route is changed into a different modulation method just before the rainfall. Occurrence of the line failure caused by the rainfall can be forestalled due to the change of the modulation method. Furthermore, since it becomes possible to decrease a transmission bandwidth due to the change to the different modulation method, stable communication can be maintained and the network can be utilized maximally.

Figure 5:
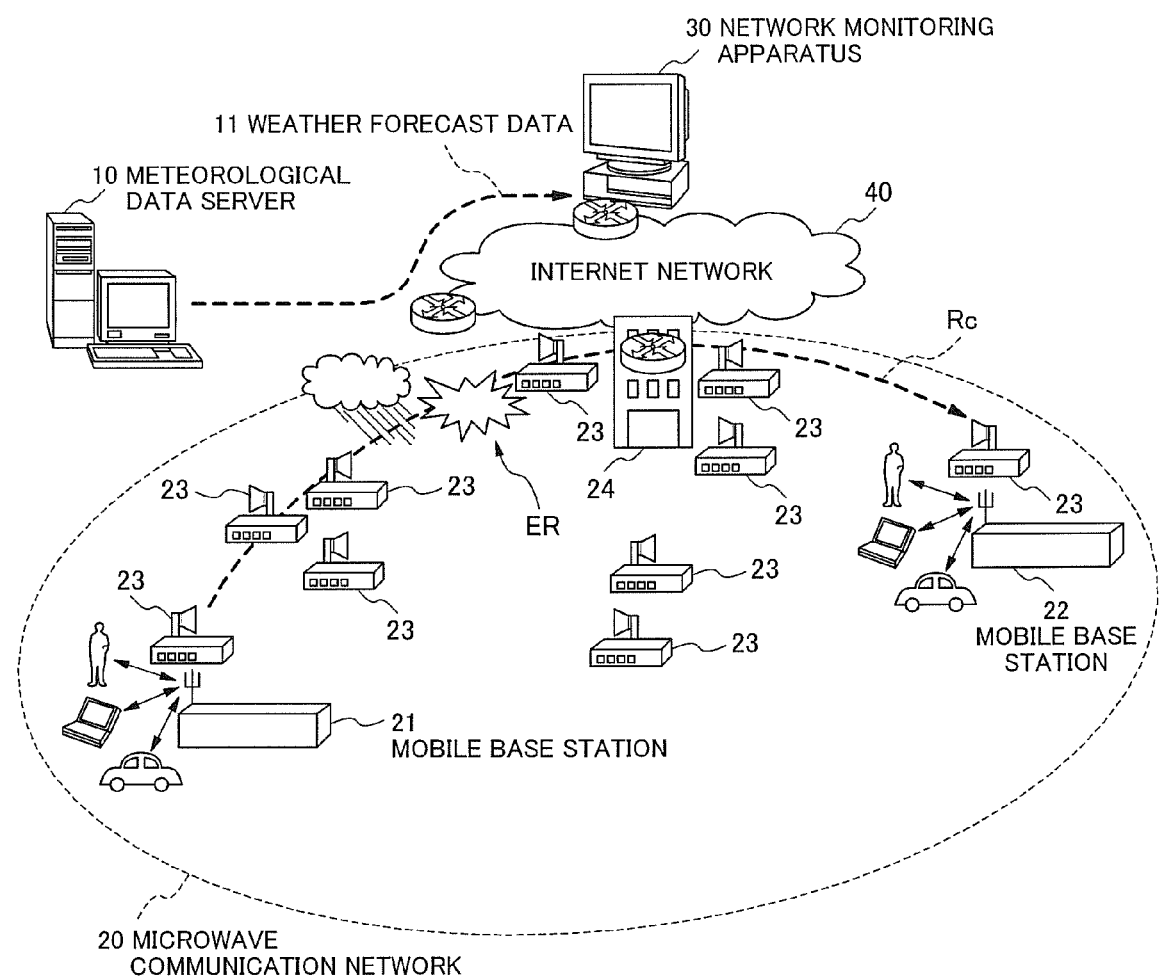
FIG. 5 shows a line failure prevention system according to a different embodiment of the present invention.

With reference to FIG. 5, the line failure prevention system according to the different embodiment of the present invention includes the same constituent with the same reference number as that with the reference number of the line failure prevention system of FIG. 1 respectively.

The line failure prevention system shown in FIG. 5 includes a network monitoring apparatus 30. The network monitoring apparatus 30 connects with a meteorological data server 10 and a microwave communication network 20 via Internet 40. The microwave communication network 20 includes mobile base stations 21 and 22, a plurality of microwave relay stations 23 and an operation center 24 which performs traffic management of a plurality of the radio stations (the mobile base stations 21 and 22 and the plurality of microwave relay stations 23). The network monitoring apparatus 30 connects with the operation center 24 of the microwave communication network 20 via the internet network 40.

Figure 6:
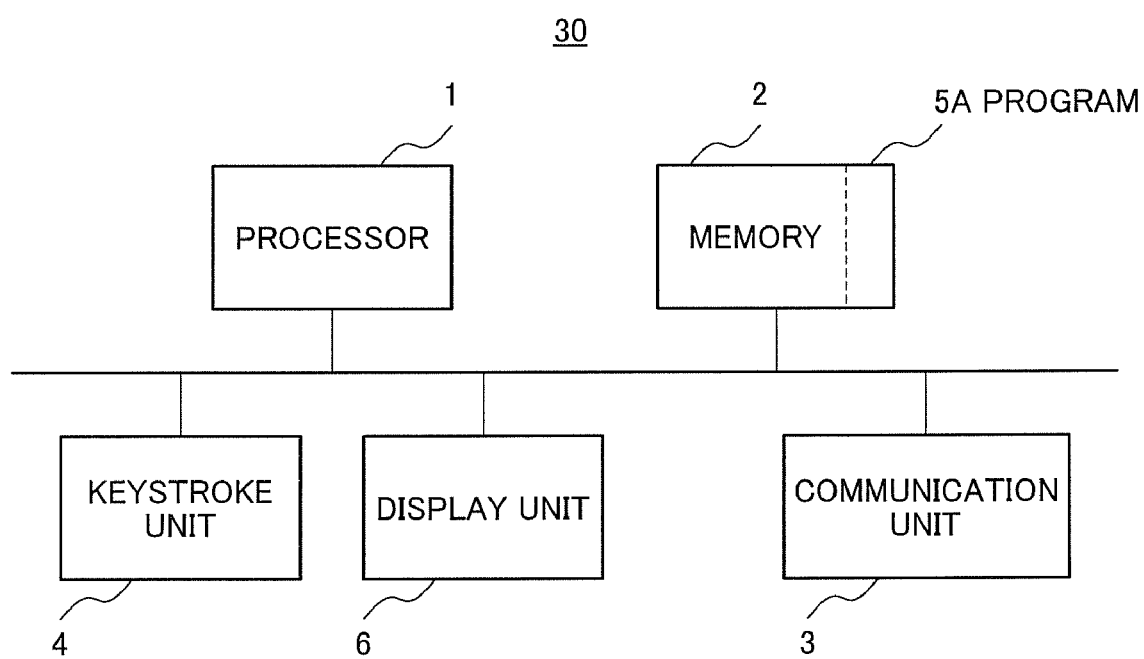
FIG. 6 is a block diagram of a network monitoring apparatus of the line failure prevention system shown in FIG. 5.

Referring to FIG. 6, the network monitoring apparatus 30 is a computer terminal having a processor 1 and a memory 2. The memory 2 stores a different program 5A (different program of the network monitoring apparatus) for the processor 1 to carry out a predetermined process. The memory 2 also works as a temporary memory when the processor 1 executes the program 5A. Further, the network monitoring apparatus 30 includes a key inputting unit 4 and a communication unit 3. The communication unit 3 communicates with the meteorological data server 10 and the operation center 24 of the microwave communication network 20 via the Internet 40. Moreover, the network monitoring apparatus 30 includes a display 6 composed of a liquid crystal display, for example. The display 6 is controlled by the processor 1.

The processor 1 carries out following process as the above-mentioned predetermined process according to the program 5A (program of the network monitoring apparatus) stored in the memory 2.

Figure 7:
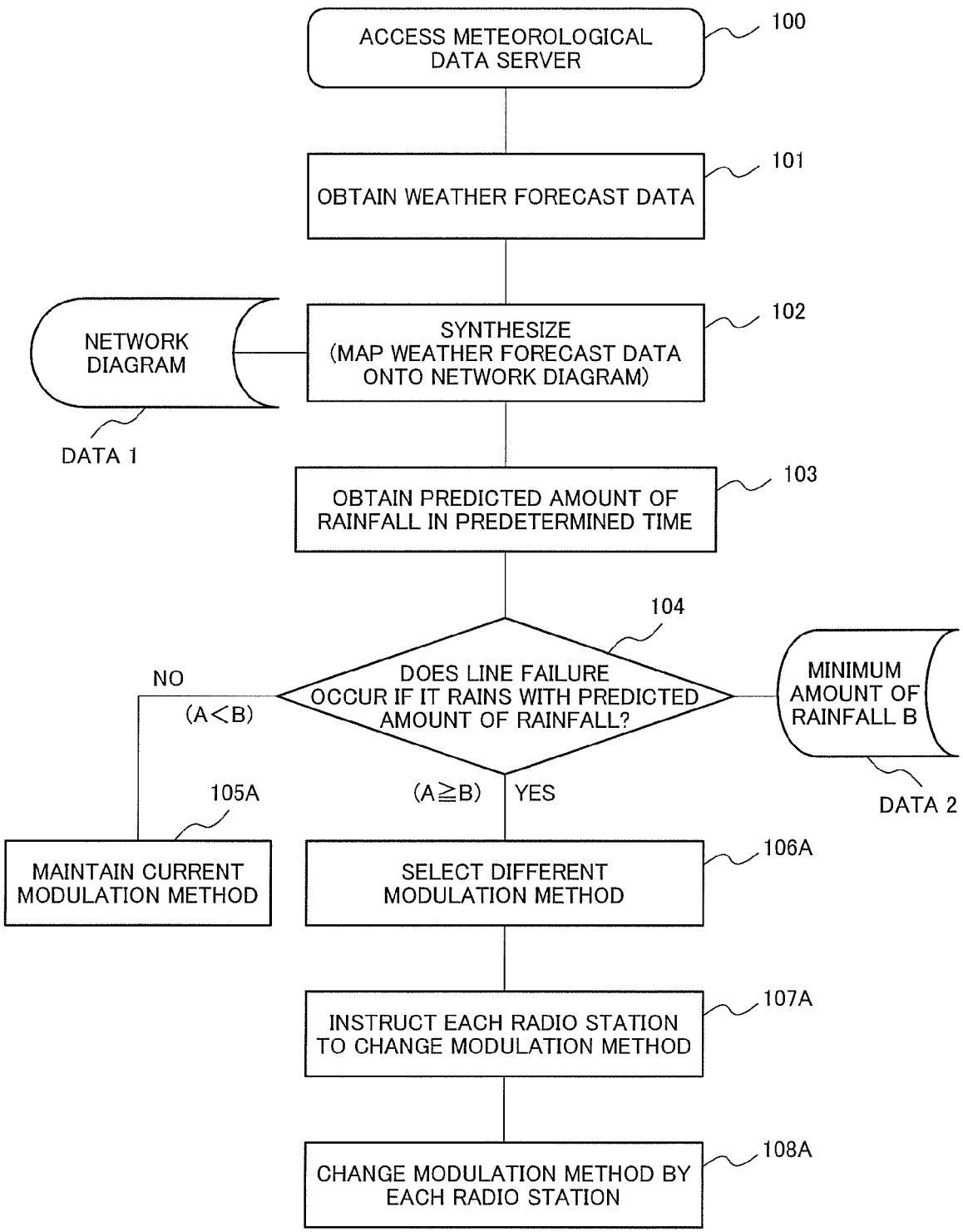
FIG. 7 is a flowchart illustrating operation of the network monitoring apparatus shown in FIG. 6.

That is, with reference to FIG. 5 to FIG. 7, the processor 1 controls the memory 2 to store a network diagram (area surrounded with a broken line, that is, area with reference number 20 of FIG. 5) that is a map onto which a plurality of the radio stations 21, 22 and 23 of the microwave communication network 20 and a current circuit route Rc are mapped as a storing data (DATA1 of FIG. 7).

The processor 1 may display the network diagram onto which a plurality of the radio stations 21, 22 and 23 and the current circuit route Rc are mapped in the display 6.

The processor 1 controls the memory 2 to store a minimum amount of rainfall B which causes the line failure as a different storing data (DATA2 of FIG. 7).

Then, the processor 1 accesses the meteorological data server 10 and obtains a weather forecast data 11 that is a map onto which a predicted amount of rainfall A in the predetermined time in different places is mapped (Steps 100 and 101 of FIG. 7). FIG. 4 shows the weather forecast data 11 provided by the meteorological data server 10.

According to an example of the weather forecast data 11 shown in FIG. 4, the weather forecast data 11 includes information on a rain cloud in the predetermined time described on the map as mentioned above, and information on an amount of rainfall per unit time (mm/h) in the predetermined time in different places (latitude and longitude).

Moreover, the processor 1 maps the weather forecast data 11 onto the network diagram stored in the memory 2 and controls the memory 2 to store the network diagram onto which the weather forecast data 11 is mapped (Step 102 of FIG. 7).

In this case, the processor 1 may control the display 6 to display the network diagram onto which the weather forecast data 11 is mapped.

Then, the processor 1 obtains the predicted amount of rainfall A generated in the predetermined time in the current line route of the microwave communication network on the basis of the network diagram which is stored in the memory 2 and onto which the weather forecast data 11 is mapped (Step 103 of FIG. 7).

In this way, the processor 1 carries out a predicted amount of rainfall obtaining process in which the processor 1 obtains the predicted amount of rainfall A generated in the predetermined time in the current line route Rc of the microwave communication network 20 on the basis of the weather forecast data 11 provided by the meteorological data server 10 (Steps 100 to 103 of FIG. 7)

Moreover, the processor 1 predicts whether or not the line failure ER occurs in the current line route Rc on the assumption that it rains actually in the current line route with an amount of rainfall almost equivalent to the predicted amount of rainfall A in the predetermined time in the current line route Rc (Step 104 of FIG. 7).

When any one of the predicted amount of rainfall A in the predetermined time in the current line route Rc is no less than the minimum amount of rainfall B, the processor 1 predicts that the line failure ER occurs in the current line route Rc. The minimum amount of rainfall B is stored in the memory 2 in advance.

On the other hand, when all of the predicted amount of rainfall A in the predetermined time in the current line route Rc are less than the minimum amount of rainfall B, the processor 1 predicts that the line failure ER does not occur in the current line route Rc.

Predicting that the line failure ER occurs in the current line route Rc, the processor 1 instructs a plurality of the radio stations 21, 22 and 23 which compose the current route to change the current modulation method of a plurality of the radio stations 21, 22 and 23 which compose the current route Rc into the different modulation method which does not suffer from the line failure even on raining with a rainfall corresponding to the rainfall A (Step 106A), before the predetermined time passes (Step 107A), and the processor 1 carries out a modulation method change instruction process in which the processor 1 controls a plurality of radio stations 21, 22 and 23 which compose the current route Rc to change the current modulation method into the different modulation method (Step 108A).

On the other hand, predicting that the line failure ER does not occur in the current line route Rc, the processor 1 carries out a process to maintain the current modulation method of a plurality of the radio stations 21, 22 and 23 which compose the current line route Rc without instruction to a plurality of the radio stations 21, 22 and 23 which compose the current line route Rc to change the modulation method for radio communication (Step 105A).

According to the different embodiment of the present invention, when it is judged that the predicted rainfall causes some influence to line quality, the network monitoring apparatus 30 instructs the microwave communication apparatus of each radio station included in the target line route to change the modulation method for radio communication just before rainfall, by applying Adaptive Modulation method to the microwave communication apparatus of each of radio stations 21, 22 and 23.

Thus, according to the different embodiment of the present invention, degradation of the line quality caused by the rainfall can be prevented in advance. Furthermore, according to the different embodiment of the present invention, the microwave communication network 20 can be utilized efficiently.

Further, the different embodiment shown in FIG. 5 to FIG. 7 is different from the embodiment shown in FIG. 1 to FIG. 3 in the following points (1) and (2).

(1) The program 5A of the network monitoring apparatus 30 shown in FIG. 5 and FIG. 6 is used instead of the program 5 of the network monitoring apparatus 30 shown in FIG. 1 and FIG. 2.

(2) Thereby, Steps 105A, 106A, 107A and 108A shown in the flowchart of FIG. 7 are carried out by the network monitoring apparatus 30 instead of Steps 105, 106, 107 and 108 shown in the flowchart of FIG. 3.

Since detail of constituent of the line failure prevention system of FIG. 5 and detail of the operation of Steps 100 to 104 shown in the flowchart of FIG. 7 are same as the above mentioned detail of constituent of the line failure prevention system of FIG. 1 and detail of the operation of Steps 100 to 104 shown in the flowchart of FIG. 3 respectively, more description will be omitted.

The present invention is not limited to the mobile network. The present invention can be applied to any type of the radio communication systems which use a microwave, such as the microwave communication system for a main line which is backbone of the communication network, and a broadcast communication network.

A third embodiment of the present invention relates to a network monitoring apparatus.

The network monitoring apparatus which is connected with a meteorological data server and a radio communication network and which monitors the radio communication network, the network monitoring apparatus including a processor.

The processor, as the predetermined process, carries out, a predicted amount of rainfall obtaining process to obtain a predicted amount of rainfall generated in a predetermined time in a current line route of the radio communication network on the basis of a weather forecast data of the meteorological data server;

a prediction process to predict whether or not a line failure occurs in the current line route caused by the predicted rainfall assuming that it rains actually in the current line route with an amount of rainfall substantially equivalent to the predicted amount of rainfall in the predetermined time in the current line route; and a change instruction process to instructs the radio communication network to change the current line route into a different line route on which it is predicted that no line failure caused by rainfall occurs and to control the radio communication network to change the current line route into the different line route, before the predetermined time passes, when it is predicted that the line failure occurs in the current line route.

A fourth embodiment of the present invention relates to a line failure prevention system.

The line failure prevention system, includes;

a meteorological data server;

a radio communication network; and a network monitoring apparatus which is connected with the meteorological data server and the radio communication network and monitors the radio communication network.

The network monitoring apparatus includes a processor. And the processor, as the predetermined process, carries out, a predicted amount of rainfall obtaining process to obtain a predicted amount of rainfall generated in a predetermined time in a current line route of the radio communication network on the basis of a weather forecast data of the meteorological data server;

a prediction process to predict whether or not a line failure occurs in the current line route caused by the predicted rainfall assuming that it rains actually in the current line route with an amount of rainfall substantially equivalent to the predicted amount of rainfall in the predetermined time in the current line route; and a change instruction process to instructs the radio communication network to change the current line route into a different line route on which it is predicted that no line failure caused by rainfall occurs and to control the radio communication network to change the current line route into the different line route, before the predetermined time passes, when it is predicted that the line failure occurs in the current line route.

A fifth embodiment of the present invention relates to a program for a network monitoring apparatus.

The network monitoring apparatus which is connected with a meteorological data server and a radio communication network and which monitors the radio communication network, the network monitoring apparatus including a processor and a memory, the memory storing a program for the processor to carry out a predetermined process and working as a temporary memory when the processor executes the program.

The program controls the processor to carry out, as the predetermined process, a predicted amount of rainfall obtaining process to obtain a predicted amount of rainfall generated in a predetermined time in a current line route of the radio communication network on the basis of a weather forecast data of the meteorological data server;

a prediction process to predict whether or not a line failure occurs in the current line route caused by the predicted rainfall assuming that it rains actually in the current line route with an amount of rainfall substantially equivalent to the predicted amount of rainfall in the predetermined time in the current line route; and a change instruction process to instructs the radio communication network to change the current line route into a different line route on which it is predicted that no line failure caused by rainfall occurs and to control the radio communication network to change the current line route into the different line route, before the predetermined time passes, when it is predicted that the line failure occurs in the current line route.

A sixth embodiment of the present invention relates to a method for monitoring a network.

The network monitoring apparatus which is connected with a meteorological data server and a radio communication station monitors a radio communication network. The network monitoring method includes:

a predicted amount of rainfall obtaining step to obtain a predicted amount of rainfall generated in a predetermined time in a current line route of the radio communication network on the basis of a weather forecast data of the meteorological data server;

a prediction step to predict whether or not a line failure occurs in the current line route on the assumption that it rains actually in the current line route with an amount of rainfall almost equivalent to the predicted amount of rainfall in the predetermined time in the current line route; and a modulation method change instruction step to instruct a plurality of radio stations which compose the current route to change a current modulation method of a plurality of the radio stations which compose the current route into a different modulation method which does not suffer from the line failure even on raining with an amount of rainfall corresponding to the predicted amount of rainfall before the predetermined time passes, and to control a plurality of the radio stations which compose the current route to change the current modulation method into the different modulation method when it is predicted that the line failure occurs in the current line route.

A seventh embodiment of the present invention relates to a network monitoring apparatus.

The network monitoring apparatus which is connected with a meteorological data server and a radio communication station monitors a radio communication network. The network monitoring apparatus includes a processor. The processor carries out, as the predetermined process:

a predicted amount of rainfall obtaining process to obtain the predicted amount of rainfall generated in a predetermined time in a current line route of the radio communication network, on the basis of weather forecast data of the meteorological data server;

a prediction process to predict whether or not the line failure occurs in the current line route on the assumption that it rains actually in the current line route with an amount of rainfall almost equivalent to the predicted amount of rainfall in the predetermined time in the current line route; and a modulation method change instruction process to instruct a plurality of radio stations which compose the current route to change the current modulation method of a plurality of the radio stations which compose the current route to the different modulation method which does not suffer from the line failure even on raining with an amount of rainfall corresponding to the predicted amount of rainfall before the predetermined time passes, and to control a plurality of the radio stations which compose the current route to change the current modulation method to the different modulation method when it is predicted that the line failure occurs in the current line route.

A eighth embodiment of the present invention relates to a line failure prevention system which includes a meteorological data server, a radio communication network and a network monitoring apparatus which is connected to the meteorological data server and the radio communication network and monitors the radio communication network.

The network monitoring apparatus includes a processor.

The processor carries out, as the predetermined process, the predicted amount of rainfall obtaining process to obtain the predicted amount of rainfall generated in a predetermined time in the current line route which compose the radio communication network on the basis of the weather forecast data of the data server, a prediction process to predict whether or not the line failure occurs in the current line route on the assumption that it rains actually in the current line route with an amount of rainfall almost equivalent to the predicted amount of rainfall in the predetermined time in the current line route, and a change instruction process to instruct the plurality of radio stations which compose the current route to change the current modulation method of the plurality of the radio stations which compose the current route to a different modulation method which does not suffer from the line failure even on raining with an amount of rainfall corresponding to the predicted amount of rainfall, before the predetermined time passes, and to control the plurality of the radio stations which compose the current route to change the current modulation method to the different modulation method, when it is predicted that the line failure occurs in the current line route.

A ninth embodiment of the present invention relates to a program of a network monitoring apparatus.

The network monitoring apparatus which is connected with a meteorological data server and a radio communication network monitors the radio communication network. The network monitoring apparatus includes a processor and a memory. The memory stores the program for the processor to carry out a predetermined process, and works as a temporary memory when the processor executes the program.

The program to control the processor includes, as the predetermined process, a predicted amount of rainfall obtaining process to obtain the predicted amount of rainfall generated in a predetermined time in the current line route of the radio communication network, on the basis of the weather forecast data of the meteorological data server, a prediction process to predict whether or not the line failure occurs in the current line route, on the assumption that it rains actually in the current line route with an amount of rainfall almost equivalent to the predicted amount of rainfall in the predetermined time in the current line route; and a modulation method change instruction process to instruct the plurality of radio stations which compose the current route to change the current modulation method to the different modulation method which does not suffer from the line failure even on raining with an amount of rainfall corresponding to the predicted amount of rainfall before the predetermined time passes, and to control the plurality of the radio stations which compose the current route to change the current modulation method to the different modulation method, when it is predicted that the line failure occurs in the current line route.

According to the related art described in the background art, since degradation of the line quality is judged after actual rainfall, the related art has a problem that the rainfall (usual rainfall, heavy rainfall, squall or the like) except for a light rainfall may cause the line failure or the line disconnect at the point of time on detecting the actual rainfall. Moreover, the problem includes that a temporary line disconnect may occur before changing the line route to the different line route or before changing the modulation method.

Another object of the present invention is to provide the network monitoring method, the network monitoring apparatus, the line failure prevention system, and the computer program of the network monitoring apparatus, which can prevent in advance occurrence of the line failure caused by the rainfall, by predicting occurrence of the line failure generated in the predetermined time based on the predicted amount of rainfall in the predetermined time which is provided by the meteorological data server, and by changing consequently modulation method into the most suitable modulation method before it begins to rain.

According to the network monitoring method, the network monitoring apparatus, the line failure prevention system and the program of the network monitoring apparatus of the embodiment of the present invention shown in FIG. 1 to FIG. 4, by predicting occurrence of the line failure generated in the predetermined time on the basis of the predicted amount of rainfall in the predetermined time provided by the meteorological data server, and consequently by changing the line route into the most suitable line route before it begins to rain, occurrence of the communication failure in the radio communication network caused by the rainfall can be prevented in advance.

According to the network monitoring method, the network monitoring apparatus, the line failure prevention system and the program for the network monitoring apparatus of the different embodiment of the present invention shown in FIG. 5 to FIG. 7, by predicting occurrence of the line failure (degradation of line quality) generated in the predetermined time on the basis of the predicted amount of rainfall in the predetermined time provided by the meteorological data server, and by consequently changing the modulation method into the most suitable modulation method before it begins to rain, occurrence of the communication failure in the radio communication network caused by the rainfall can be prevented in advance.

As mentioned above, the radio stations which compose the radio communication network do not detect the actual rainfall and also do not judges degradation of the line quality after detecting the actual rainfall, according to the present invention. Occurrence of the line failure (degradation of the line quality) in the predetermined time is predicted based on the predicted amount of rainfall in the predetermined time provided by the meteorological data server, according to the present invention. The above mentioned patent documents 1 to 4 do not disclose the prediction of occurrence of the line failure (degradation of the line quality) in the predetermined time based on the predicted amount of rainfall in the predetermined time provided by the meteorological data server While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A network monitoring method to be carried out by a processor in a network monitoring apparatus which is connected with a meteorological data server and a radio communication network and which monitors said radio communication network, said method comprising the steps of:
    a predicted amount of rainfall obtaining step of obtaining a predicted amount of rainfall generated in a predetermined time in a current line route in a radio communication network on the basis of weather forecast data of said meteorological data server;
    a prediction step of predicting whether or not a line failure occurs in said current line route caused by said predicted amount of rainfall assuming it rains actually in said current line route with an amount of rainfall substantially equivalent to said predicted amount of rainfall in said predetermined time in said current line route; and
    a change instruction step of instructing said radio communication network to change said current line route into a different line route on which it is predicted that no line failure caused by rainfall occurs and to control said radio communication network to change said current line route into said different line route, before said predetermined time passes, when it is predicted that said line failure occurs in said current line route.

2. The network monitoring method according to claim 1, further comprising:
    a step of storing a network diagram that is a map onto which a plurality of radio stations of said radio communication network and said current line route are mapped, in said memory, wherein
said predicted amount of rainfall obtaining step includes:
    a step of accessing said meteorological data server and to obtain said weather forecast data that is a map onto which said predicted amount of rainfall in different places in said predetermined time is mapped;
    a step of mapping said weather forecast data onto said network diagram stored in said memory and to store said network diagram onto which said weather forecast data is mapped in said memory; and
    a step of obtaining said predicted amount of rainfall generated in said predetermined time in said current line route of said radio communication network on the basis of said network diagram which is stored in said memory and onto which said weather forecast data is mapped.

3. The network monitoring method according to claim 2, further comprising:
    a step of storing a minimum amount of rainfall which causes said line failure in said memory, wherein
said prediction step is a step of predicting that said line failure occurs in said current line route, when any one of said predicted amount of rainfall in said predetermined time in said current line route is no less than said minimum amount of rainfall stored in said memory.

4. The network monitoring method according to claim 3, wherein
    said prediction step is a step of predicting that said line failure does not occur on said current line route, when all of said predicted amount of rainfall in said predetermined time in said current line route are less than said minimum amount of rainfall stored in said memory.

5. The network monitoring method according to claim 4, further comprising:
    a step of maintaining said current line route without instruction to said radio communication network to change said current line route into said different line route when it is predicted that said line failure does not occur in said current line route.

6. The network monitoring method according to claim 3, wherein
said change instruction step is a step of instructing a plurality of said radio stations of said radio communication network to change said current line route into said different line route on which it is predicted that said line failure does not occur and to control said plurality of said radio stations of said radio communication network to change said current line route into said different line route, before said predetermined time passes, when it is predicted that said line failure occurs in said current line route.

7. A network monitoring apparatus which is connected with a meteorological data server and a radio communication network and which monitors said radio communication network, said network monitoring apparatus including a processor, wherein said processor, as said predetermined process, carries out,
a predicted amount of rainfall obtaining process to obtain a predicted amount of rainfall generated in a predetermined time in a current line route of said radio communication network on the basis of a weather forecast data of said meteorological data server;
a prediction process to predict whether or not a line failure occurs in said current line route caused by said predicted rainfall assuming that it rains actually in said current line route with an amount of rainfall substantially equivalent to said predicted amount of rainfall in said predetermined time in said current line route; and
a change instruction process to instructs said radio communication network to change said current line route into a different line route on which it is predicted that no line failure caused by rainfall occurs and to control said radio communication network to change said current line route into said different line route, before said predetermined time passes, when it is predicted that said line failure occurs in said current line route.

8. The network monitoring apparatus according to claim 7, wherein
said processor, as said predetermined processing, carries out a process to store a network diagram that is a map onto which a plurality of radio stations of said radio communication network and said current line route are mapped, in said memory, wherein
said predicted amount of rainfall obtaining process includes, a process to access said meteorological data server and to obtain said weather forecast data that is a map onto which said predicted amount of rainfall in different places in said predetermined time is mapped;
a process to map said weather forecast data onto said network diagram stored in said memory and to store said network diagram onto which said weather forecast data is mapped in said memory; and
a process to obtain said predicted amount of rainfall generated in said predetermined time in said current line route of said radio communication network on the basis of said network diagram which is stored in said memory and onto which said weather forecast data is mapped.

9. The network monitoring apparatus according to claim 8, wherein
said processor, as said predetermined process, carries out a process to store a minimum amount of rainfall which causes said line failure in said memory, and wherein
said prediction process is a process to predict that said line failure occurs in said current line route, when any one of said predicted amount of rainfall in said predetermined time in said current line route is no less than said minimum amount of rainfall stored in said memory.

10. The network monitoring apparatus according to claim 9, wherein
said prediction process is a process to predict that said line failure does not occur in said current line route, when all of said predicted amount of rainfall in said predetermined time in said current line route are less than said minimum amount of rainfall stored in said memory.

11. The network monitoring apparatus according to claim 10, wherein
said processor, as said predetermined process, carries out a process to maintain said current line route without instruction to said radio communication network to change said current line route into said different line route when it is predicted that said line failure does not occur in said current line route.

12. The network monitoring apparatus according to claim 9, wherein
said change instruction process is a process to instruct a plurality of said radio stations of said radio communication network to change said current line route into said different line route on which it is predicted that said line failure does not occur and to control said plurality of said radio stations of said radio communication network to change said current line route into said different line route, before said predetermined time passes, when it is predicted that said line failure occurs in said current line route.

13. A line failure prevention system, comprising;
a meteorological data server;
a radio communication network; and
a network monitoring apparatus which is connected with said meteorological data server and said radio communication network and monitors said radio communication network, wherein
said network monitoring apparatus includes a processor, and wherein
said processor, as said predetermined process, carries out,
a predicted amount of rainfall obtaining process to obtain a predicted amount of rainfall generated in a predetermined time in a current line route of said radio communication network on the basis of a weather forecast data of said meteorological data server;
a prediction process to predict whether or not a line failure occurs in said current line route caused by said predicted rainfall assuming that it rains actually in said current line route with an amount of rainfall substantially equivalent to said predicted amount of rainfall in said predetermined time in said current line route; and
a change instruction process to instructs said radio communication network to change said current line route into a different line route on which it is predicted that no line failure caused by rainfall occurs and to control said radio communication network to change said current line route into said different line route, before said predetermined time passes, when it is predicted that said line failure occurs in said current line route.

14. The line failure prevention system according to claim 13, wherein
said processor, as said predetermined processing, carries out a process to store a network diagram that is a map onto which a plurality of radio stations of said radio communication network and said current line route are mapped, in said memory, wherein
said predicted amount of rainfall obtaining process includes, a process to access said meteorological data server and to obtain said weather forecast data that is a map onto which said predicted amount of rainfall in different places in said predetermined time is mapped;

a process to map said weather forecast data onto said network diagram stored in said memory and to store said network diagram onto which said weather forecast data is mapped in said memory; and a process to obtain said predicted amount of rainfall generated in said predetermined time in said current line route of said radio communication network on the basis of said network diagram which is stored in said memory and onto which said weather forecast data is mapped.

15. The line failure prevention system according to claim 14, wherein
said processor, as said predetermined process, carries out a process to store a minimum amount of rainfall which causes said line failure in said memory, and wherein
said prediction process is a process to predict that said line failure occurs in said current line route, when any one of said predicted amount of rainfall in said predetermined time in said current line route is no less than said minimum amount of rainfall stored in said memory.

16. The line failure prevention system according to claim 15, wherein
said prediction process is a process to predict that said line failure does not occur in said current line route, when all of said predicted amount of rainfall in said predetermined time in said current line route are less than said minimum amount of rainfall stored in said memory.

17. The line failure prevention system according to claim 16, wherein
said processor, as said predetermined process, carries out a process to maintain said current line route without instruction to said radio communication network to change said current line route into said different line route when it is predicted that said line failure does not occur in said current line route.

18. The line failure prevention system according to claim 15, wherein
said change instruction process is a process to instruct a plurality of said radio stations of said radio communication network to change said current line route into said different line route on which it is predicted that said line failure does not occur and to control said plurality of said radio stations of said radio communication network to change said current line route into said different line route, before said predetermined time passes, when it is predicted that said line failure occurs in said current line route.

19. A program for a network monitoring apparatus which is connected with a meteorological data server and a radio communication network and which monitors said radio communication network, said network monitoring apparatus including a processor and a memory, said memory storing a program for said processor to carry out a predetermined process and working as a temporary memory when said processor executes said program, wherein
said program controls said processor to carry out, as said predetermined process,
a predicted amount of rainfall obtaining process to obtain a predicted amount of rainfall generated in a predetermined time in a current line route of said radio communication network on the basis of a weather forecast data of said meteorological data server;

a prediction process to predict whether or not a line failure occurs in said current line route caused by said predicted rainfall assuming that it rains actually in said current line route with an amount of rainfall substantially equivalent to said predicted amount of rainfall in said predetermined time in said current line route; and a change instruction process to instructs said radio communication network to change said current line route into a different line route on which it is predicted that no line failure caused by rainfall occurs and to control said radio communication network to change said current line route into said different line route, before said predetermined time passes, when it is predicted that said line failure occurs in said current line route.

20. The program for the network monitoring apparatus according to claim 19, wherein
said program controls said processor to carry out, as said predetermined process, a process to store a network diagram that is a map onto which a plurality of radio stations of said radio communication network and said current line route are mapped, in said memory,
wherein
said predicted amount of rainfall obtaining process includes,
a process to access said meteorological data server and to obtain said weather forecast data that is a map onto which said predicted amount of rainfall in different places in said predetermined time is mapped;
a process to map said weather forecast data onto said network diagram stored in said memory and to store said network diagram onto which said weather forecast data is mapped in said memory; and
a process to obtain said predicted amount of rainfall generated in said predetermined time in said current line route of said radio communication network on the basis of said network diagram which is stored in said memory and onto which said weather forecast data is mapped.

21. The program for the network monitoring apparatus according to claim 20, wherein
said program controls said processor to further carry out, as said predetermined process, a process to store a minimum amount of rainfall which causes said line failure in said memory, and wherein said prediction process is a process to predict that said line failure occurs in said current line route, when any one of said predicted amount of rainfall in said predetermined time in said current line route is no less than said minimum amount of rainfall stored in said memory.

22. The program for the network monitoring apparatus according to claim 21, wherein
said prediction process is a process to predict that said line failure does not occur in said current line route, when all of said predicted amount of rainfall in said predetermined time in said current line route are less than said minimum amount of rainfall stored in said memory.

23. The program for the network monitoring apparatus according to claim 22, wherein
said program controls said processor to carry out, as said predetermined process, a process to maintain said current line route without instruction to said radio communication network to change said current line route into said different line route when it is predicted that said line failure does not occur in said current line route.

24. The program for the network monitoring apparatus according to claim 21, wherein
said change instruction process is a process to instruct a plurality of said radio stations of said radio communication network to change said current line route into said different line route on which it is predicted that said line failure does not occur and to control said plurality of said radio stations of said radio communication network to change said current line route into said different line route, before said predetermined time passes, when it is predicted that said line failure occurs in said current line route.

* * * * *